(12) United States Patent
Xu et al.

(10) Patent No.: US 9,451,356 B2
(45) Date of Patent: Sep. 20, 2016

(54) MULTI-DIRECTIVITY SOUND DEVICE

(75) Inventors: Liangfeng Xu, Coppell, TX (US); Xia S. Wang, Beijing (CN); Chenguang Cai, Beijing (CN); Jani K. Nurminen, Lempaala (FI); Antti O. Salo, Lohja (FI); Limei Xu, Chengdu (CN); Xuesheng Li, Chengdu (CN); Yi Wang, Boon Lay Place (SG); Min Chen, Chengdu (CN)

(73) Assignee: Nokia Technologies Oy, Espoo (FI)

( * ) Notice: Subject to any disclaimer, the term of this patent is extended or adjusted under 35 U.S.C. 154(b) by 939 days.

(21) Appl. No.: 12/317,070

(22) Filed: Dec. 18, 2008

(65) Prior Publication Data

US 2010/0158287 A1 Jun. 24, 2010

(51) Int. Cl.
| | |
|---|---|
| *H04R 5/02* | (2006.01) |
| *H04R 1/40* | (2006.01) |
| *H04M 1/03* | (2006.01) |
| *H04R 1/02* | (2006.01) |
| *H04R 3/12* | (2006.01) |
| *H04R 31/00* | (2006.01) |

(52) U.S. Cl.
CPC ............ *H04R 1/403* (2013.01); *H04M 1/03* (2013.01); *H04M 1/035* (2013.01); *H04R 1/028* (2013.01); *H04R 3/12* (2013.01); *H04R 31/00* (2013.01); *H04R 2430/01* (2013.01); *H04R 2499/11* (2013.01)

(58) Field of Classification Search
CPC .. H04R 1/028; H04R 2499/11; H04R 1/025; H04R 1/026; H04M 1/03; H04M 1/035

USPC .......... 381/307, 77, 79, 332, 355, 356, 386, 381/387; 181/143

See application file for complete search history.

(56) References Cited

U.S. PATENT DOCUMENTS

| | | | |
|---|---|---|---|
| 4,823,908 A | 4/1989 | Tanaka et al. | 181/175 |
| 5,059,851 A | 10/1991 | Corl et al. | 310/334 |
| 6,243,260 B1 * | 6/2001 | Lundgren et al. | 361/679.23 |
| 6,324,907 B1 | 12/2001 | Halteren et al. | 73/431 |
| 6,556,687 B1 * | 4/2003 | Manabe | 381/387 |
| 7,991,175 B2 * | 8/2011 | Nielsen et al. | 381/333 |
| 2004/0057596 A1 | 3/2004 | Green et al. | 381/423 |
| 2004/0204194 A1* | 10/2004 | Akai et al. | 455/575.1 |

(Continued)

OTHER PUBLICATIONS

IEEE Sensors 2007 Conference; S. Je and J. Chae; "An Electroagnetically Actuated Micromachined Loudspeaker for Hearing Aids Applications"; pp. 1024-1027; May 2007.

(Continued)

*Primary Examiner* — Jesse Y Miyoshi
(74) *Attorney, Agent, or Firm* — Alston & Bird LLP

(57) ABSTRACT

A sound producing apparatus with multi-directivity has two or more speakers to produce music or other types of audio sounds. Each of the speakers can produce audio sounds in a certain direction and at least one speaker is steerable so that its sound propagation direction relative to the others can be changed. Furthermore, one or more speakers can produce audio sounds in an adjustable angular range. One or more of the speakers can be dual-mode speakers, each of which can be operated as a wide-angle speaker or a narrow-angle speaker. With multi-directivity, it is possible to play one type of music in one direction and another type of music in another direction to suit the interests of the audience. The apparatus can be a mobile phone, an audio player, a digital or analog recorder/player, or the like.

20 Claims, 7 Drawing Sheets

(56) References Cited

U.S. PATENT DOCUMENTS

| | | | | |
|---|---|---|---|---|
| 2004/0209641 A1* | 10/2004 | Hong | ............... | 455/550.1 |
| 2005/0002536 A1 | 1/2005 | Gorelik et al. | ............... | 381/150 |
| 2005/0207588 A1* | 9/2005 | Biegelsen | ............... | 381/77 |
| 2006/0084468 A1* | 4/2006 | Kim | ............... | 455/550.1 |
| 2008/0159571 A1* | 7/2008 | Hooley | ............... | 381/307 |
| 2009/0117955 A1* | 5/2009 | Lo | ............... | 455/575.3 |
| 2009/0156263 A1* | 6/2009 | Park et al. | ............... | 455/566 |
| 2010/0086162 A1* | 4/2010 | Nielsen et al. | ............... | 381/333 |

OTHER PUBLICATIONS

Audio Engineering Society Convention Paper 6521; Y. Nakashima, T. Yoshimura and T. Ohya; "Prototype of Parametric Array Loudspeaker on Mobile Phone and its Acoustical Characteristics"; May 28-31, 2005.

J. Audio Engineering Society, "Loudspeaker Array Technology"; vol. 53, No. 11, pp. 1081-1084, Nov. 2005.

NTT DoCoMo Technical Journal; Y. Nakashima, T. Yoshimura, N. Naka and T. Ohya; "Prototype of Mobile Super Directional Loudspeaker"; pp. 25-32; vol. 8 No. 1.

NTT DoCoMo Technical Journal; H. Matsuoka, Y. Nakashima and T. Yoshimura; "Acoustic Communication System Using Mobile Terminal Microphones"; pp. 4-12; vol. 8 No. 2.

\* cited by examiner

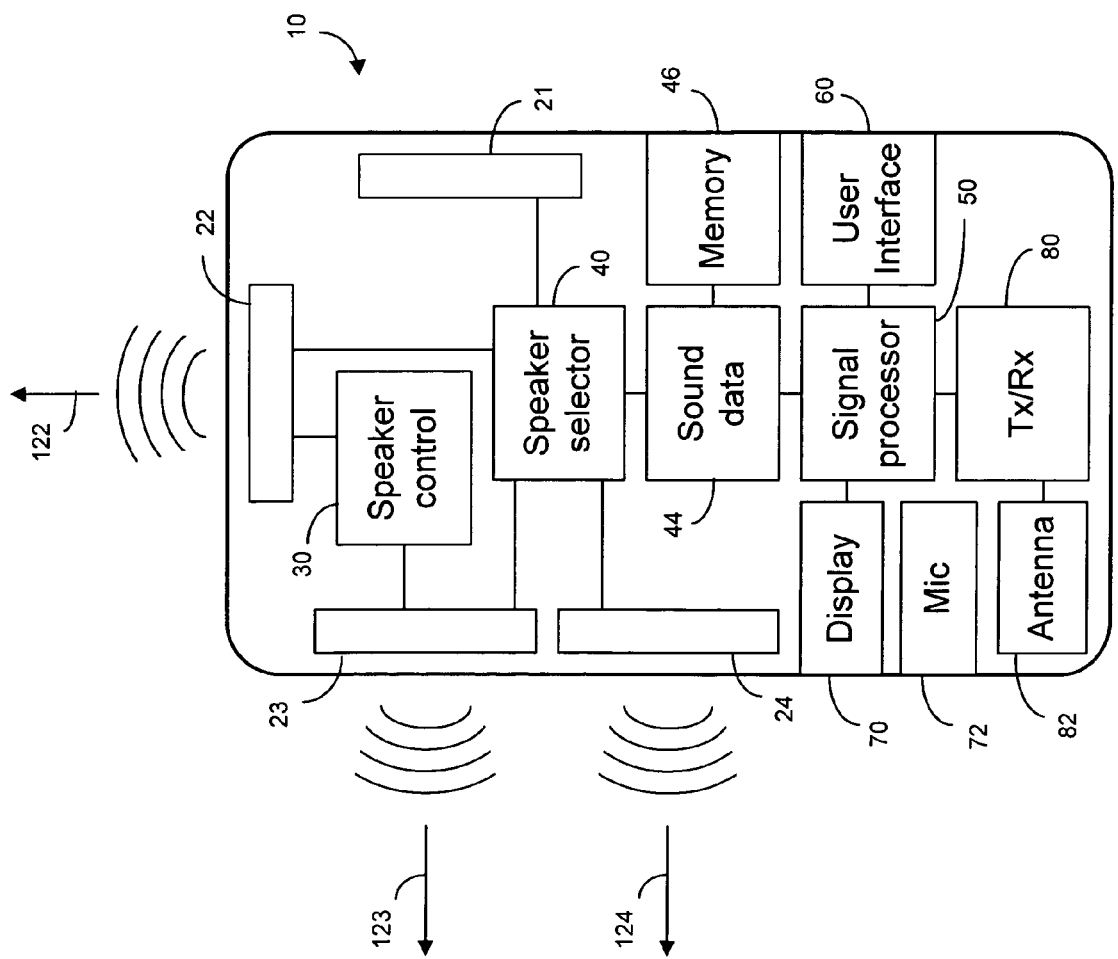

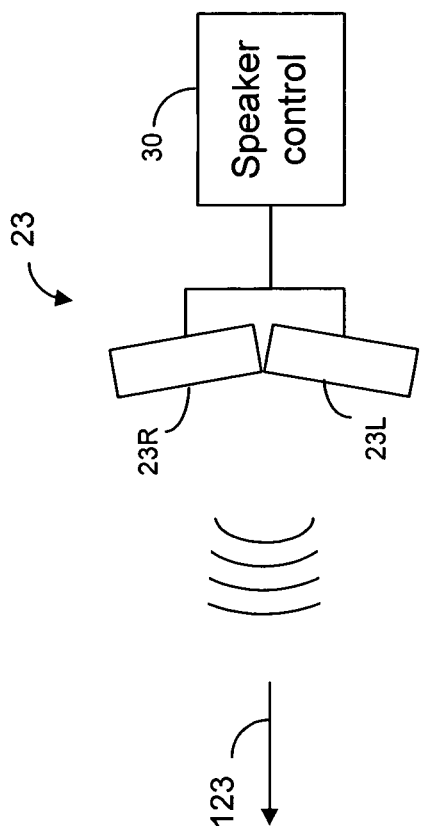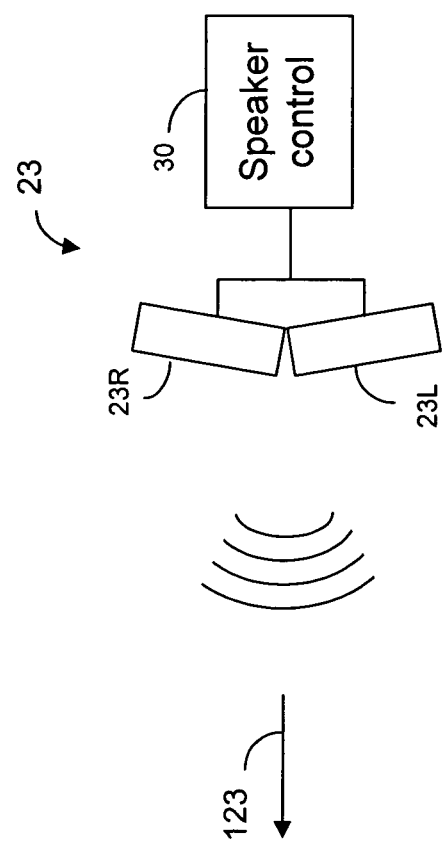

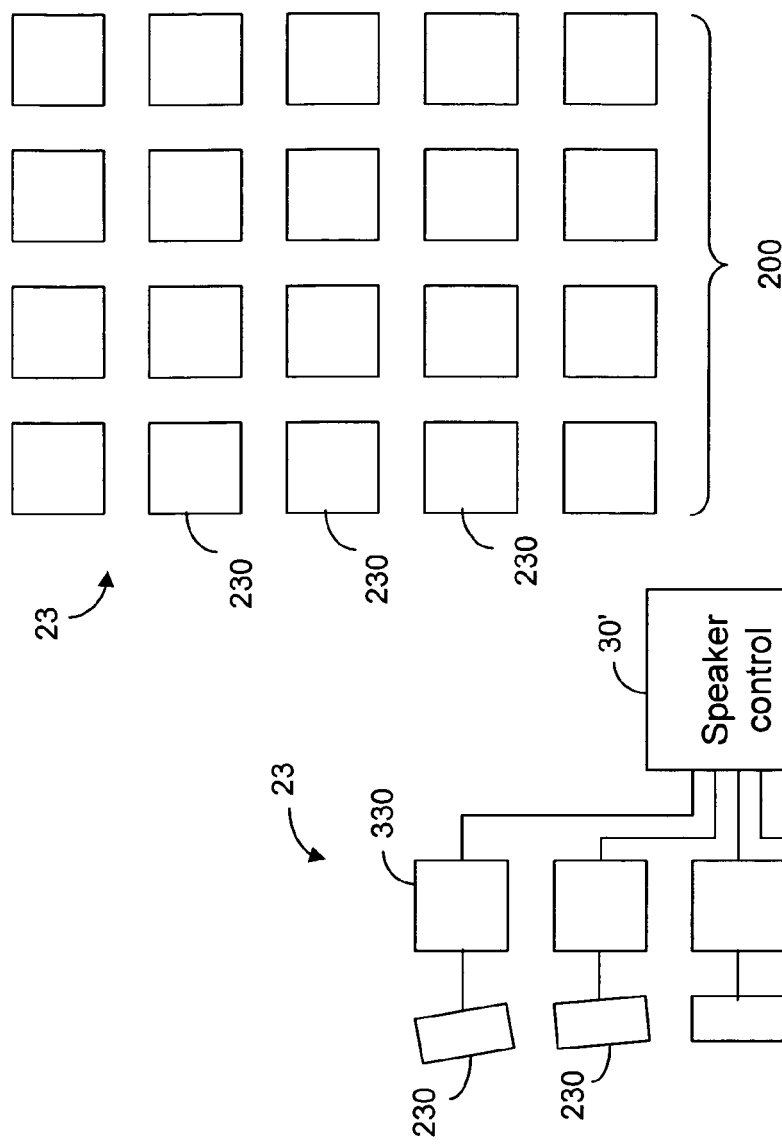
FIG. 4a
FIG. 4c
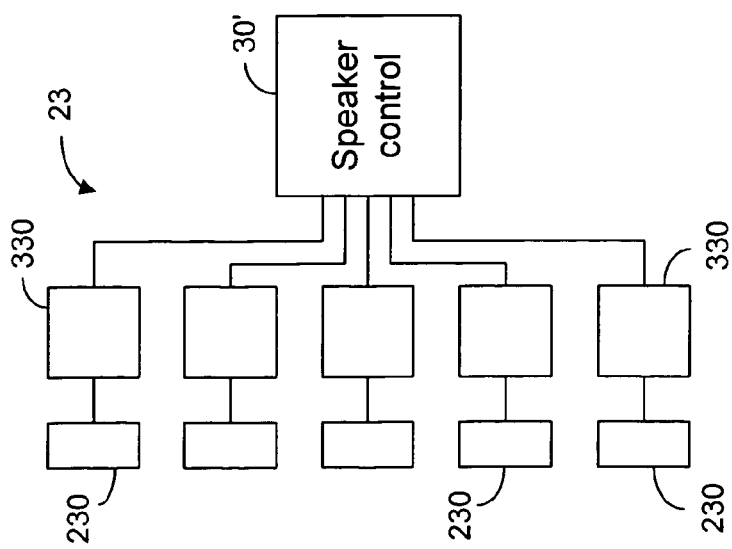
FIG. 4b

MULTI-DIRECTIVITY SOUND DEVICE

FIELD OF THE INVENTION

The present invention relates to a sound device or audio loudspeaker and, more particularly, to a multi-directivity sound device.

BACKGROUND OF THE INVENTION

Mobile phones and portable devices can include both the telecommunication and audiovisual entertaining features. The audiovisual features may include music playback, video playback, camcording, gaming, radio, audiovisual teleconferencing, etc. When the mobile phone or the portable device is used in a placed where two or more persons are present, sometimes it is desirable to share the audiovisual features with other people. Sometimes it is desirable to minimize the spread of audio sounds.

SUMMARY OF THE INVENTION

The present invention provides a sound producing apparatus with multi-directivity. The sound producing apparatus can be a mobile phone, an audio player, a digital or analog recorder/player, or the like. The sound producing apparatus has two or more speakers to produce music or other types of audio sounds. Each of the speakers can produce audio sounds in a certain direction and at least one of the speakers is steerable so that the sound propagation direction of one speaker relative to the others can be changed. Furthermore, one or more speakers can produce audio sounds in an angular range and the angular range of at least one of the speakers is adjustable. For example, one or more of the speakers are dual-mode speakers, each of which can be operated as a wide-angle speaker or a narrow-angle speaker.

Thus, the first aspect of the present invention is an apparatus, which comprises:
 a plurality of sound producing units;
 a steering control; and
 a signal source to provide signals to the sound producing units for producing audio sounds, wherein each of the sound producing units is arranged to produce the audio sounds in a sound propagation direction and wherein the steering control is arranged to change the sound propagation direction of one or more sound producing units.

According to various embodiments of the present invention, each of the sound producing units is configured to produce the audio sounds in an angular range, and the steering control is arranged to change to angular range of at least one of the sound producing units.

According to various embodiments of the present invention, the audio sounds produced on different sound producing units can be the same or different type or genre. The sounds can be stereo.

The second aspect of the present invention is a method, which comprises:
 selecting one or more of a plurality of sound producing units in a sound producing device, wherein each of the sound producing units is arranged to produce audio sounds in a sound propagation direction; and
 adjusting the sound propagation direction of at least one of the sound producing units relative to the sound propagation direction of another sound producing unit.

According to various embodiments of the present invention, each of the sound producing units is configured to produce the audio sounds in an angular range, and the method further comprises adjusting the angular range of at least one of the sound producing units.

The third aspect of the present invention is an apparatus, which comprises:
 means for producing audio sounds comprising a plurality of sound producing units, each sound producing unit arranged to produce the audio sounds in a sound propagation direction;
 means for selecting the sound producing units; and
 means for controlling the sound propagation direction of at least one selected sound producing unit.

According to various embodiments of the present invention, each of the sound producing units is configured to produce the audio sounds in an angular range, and the apparatus further comprises means for adjusting the angular range of at least one of the sound producing units.

The present invention will become apparent upon reading the description taken in conjunction with the drawings as shown in FIGS. 1 to 7.

BRIEF DESCRIPTION OF THE DRAWINGS

FIG. 1 shows a portable device, according to one embodiment of the present invention.

FIG. 3c shows another example of steering the sounds from the two sub-modules.

FIG. 3d shows a different example of steering the sound from the two sub-modules.

FIG. 4a shows an array of transducers used to produce sound in one sound producing unit.

FIG. 4b shows the steering components for steering the transducer array.

FIG. 4c shows an example of steering the transducer array.

DETAILED DESCRIPTION OF THE DISCLOSURE

Figure 2A:
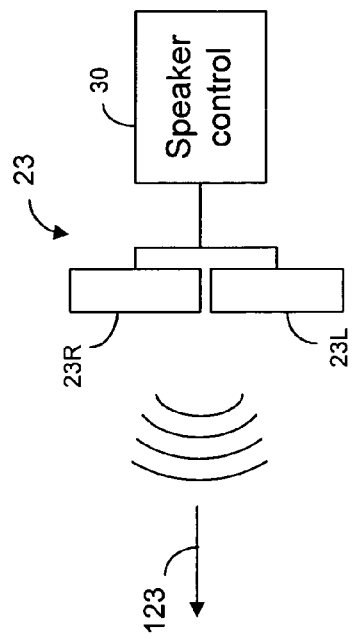
FIG. 2a shows one of the sound steering features of the present invention.

The present invention provides a sound producing apparatus with multi-directivity. The sound producing apparatus has two or more sound producing units to achieve multi-directivity. In particular, each of the sound producing units is arranged to produce audio sounds in a certain sound propagation direction. A steering control is arranged such that the sound propagation direction of one sound producing unit relative to the other can be changed. When the sound apparatus is used in a portable device such as a portable music player or a mobile phone, the sound producing apparatus can be used for telecommunication purposes, as well as entertainment purposes.

When the sound producing apparatus is used in a placed where two or more persons present, sometime it is desirable to share the audiovisual features with other people. Sometime it is desirable to minimize the spread of audio sounds. With a sound producing apparatus with multi-directivity, it is possible to play one type of music in one direction and another type of music in another direction to suit the interests of the audience.

FIG. 1 shows a sound producing apparatus with multi-directivity, according to one embodiment of the present invention. As shown in FIG. 1, the apparatus 10 can be used as a telecommunication device and as an entertainment device with two or more audio loudspeakers 21, 22, 23 and 24. Each of the audio loudspeakers is arranged to be an independent sound producing unit in that each audio loudspeaker can be selected to produce music or other type of audible sound, independent of the other. It is possible to include an antenna 82 to transmit or receive telecommunication signals through a transceiver 80. Like a mobile terminal, the apparatus 10 has a microphone 72 to allow a user to speak to another party. The user can use any one of the loudspeakers to listen to a conversation, a radio broadcast and a recording, for example. When the user wants to listen to a radio broadcast, the user can select to receive broadcast signals through the antenna 82 and the transceiver 80. The broadcast signals are processed by a signal processor 50 into sound data to be played out in any one of the loudspeakers 21-24. Alternatively, the sound data can be stored in a buffer 44. The apparatus 10 can be arranged to receive a memory unit which stores different sound data so that the stored sound data can be retrieved and played out in a different loudspeaker. The apparatus 10 has a speaker selector 40 for channeling one or more sources of sound data to different loudspeakers, for example. The apparatus 10 has a display 70 for displaying information. For example, the display 70 can be used to list the different sound data files available in the memory 46 and the buffer 44. Based on the displayed list, the user to select what sound data file or files to be played out through the user interface 60. Furthermore, the user can select which loudspeaker or loudspeakers to be used at any time.

Figure 2B:
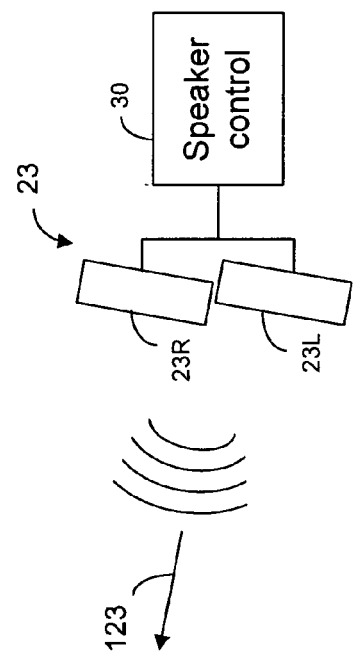
FIG. 2b shows another one of the sound steering features of the present invention.

According to various embodiments of the present invention, one or more of the loudspeakers 21-24 are steerable, mechanically and/or acoustically. As shown in FIG. 1, when the loudspeakers are used to produce audio sounds, the produced audio sounds have different sound propagation directions. For example, loudspeaker 22 produces audio sounds in direction 122, loudspeaker 23 produces audio sounds in direction 123, and loudspeaker 24 produces audio sounds in direction 124. At a certain distance, the sounds from loudspeaker 23 may mix those from loudspeaker 24. If these loudspeakers are selected to produce different types of music, sound or voice, for example, the sound mixing may not be desirable. Thus, it is advantageous and desirable to steer one or both sound sources to different directions by a speaker control 30. For example, the loudspeaker 23 is mechanically moved to change the sound propagation direction 123, as shown in FIG. 2a. In this embodiment, the speaker control 30 comprises an electro-mechanical movement means, such as a motor, a solenoid with a shaft or the like, to push the loudspeaker 23 away from its original position. The speaker control 30 may comprise a mechanical component, such as a rod, a turn-knob or the like so as to allow a user to adjust the sound propagation direction manually. The speaker control 30 may comprise a sound reflecting surface 32 the orientation of which can be adjusted in order to change the sound propagation direction as shown in FIG. 2b. The sound reflecting surface 32 can be adjusted independently or in combination with the steering of the speaker 24. Furthermore, the sound reflecting surface 32 can be flat or curved, and it can also be flexible so as to adjust the angular spread or the propagation pattern of the audio sounds.

Figure 3A:
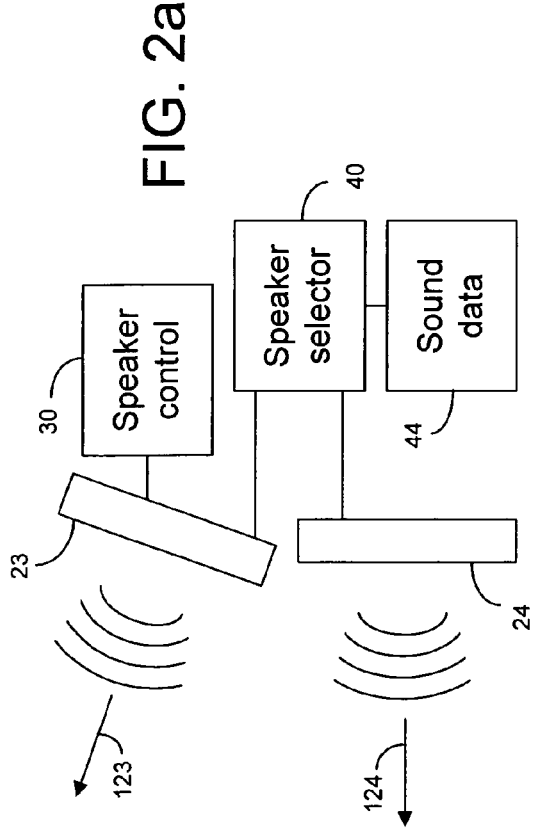
FIG. 3a shows a sound producing unit having two sub-modules, according to one embodiment of the present invention.
Figure 3B:
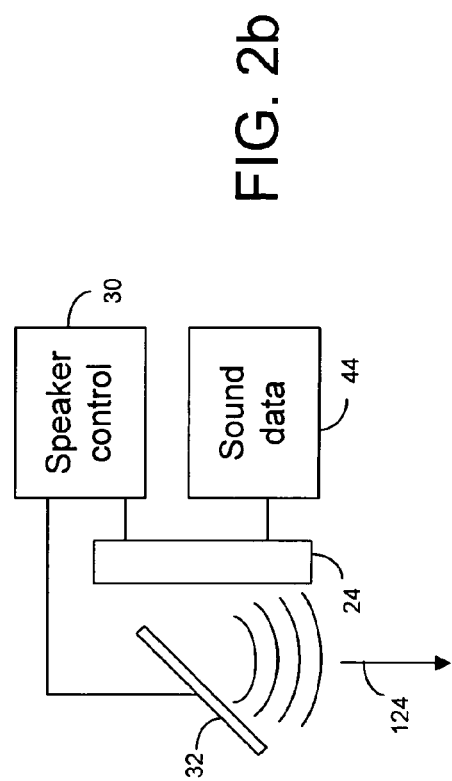
FIG. 3b shows one example of steering the sounds from the two sub-modules.

In another embodiment of the present invention, a loudspeaker includes two or more sub-units or sub-speakers. For example, the loudspeaker 23 has two separate loudspeakers 23R and 23L to produce audio sounds along the sound propagation direction 123. The loudspeakers 23R and 23L are connected to the speaker control 30 so that they can be steered relative to each other as shown in FIG. 3a. As shown in FIG. 3b, the loudspeakers 23R and 23L are steered toward the same direction to change the sound propagation direction 123. As shown in FIG. 3c, the loudspeakers 23R and 23L are steered toward each other. As such, the overall sound propagation direction 123 remains unchanged, but the sound spreading is reduced. As shown in FIG. 3d, the loudspeakers 23R and 23L are steered away from each other. As such, the overall sound propagation direction 123 remains unchanged, but the sound spreading is increased. Thus, with two or more sub-speakers, it is possible to change the overall sound propagation direction, as well as the sound-spreading angular range.

In another embodiment of the present invention, one or more of the loudspeakers can be a steerable array. As shown in FIG. 4a, the loudspeaker 23 is made of a plurality of vibration elements 230 arrange in a two-dimensional array 200. Each of the vibration elements 230 is connected to a transducer 330, and the transducers 330 are connected to a speaker control 30', as shown in FIG. 4b. The array of vibration elements 230 can be utilized in two ways. In one embodiment of the present invention, the vibration elements 230 are individually movable by the corresponding transducers 330. The vibration elements 230 can be arranged to move toward each other to change to sound-propagation angle as shown in FIG. 4c. These vibration elements can be steered away from each other, as shown in FIG. 3d, or steered toward the same direction as shown in FIG. 3c. In a different embodiment, the vibration elements 230 form a phase array such that the propagation direction or the propagation angle can be changed by adjusting the relative phase among the vibration elements 230. In this embodiment, the speaker control 30' is also used to adjust the phase of the vibrations in each of the vibration elements 230.

Figure 5:
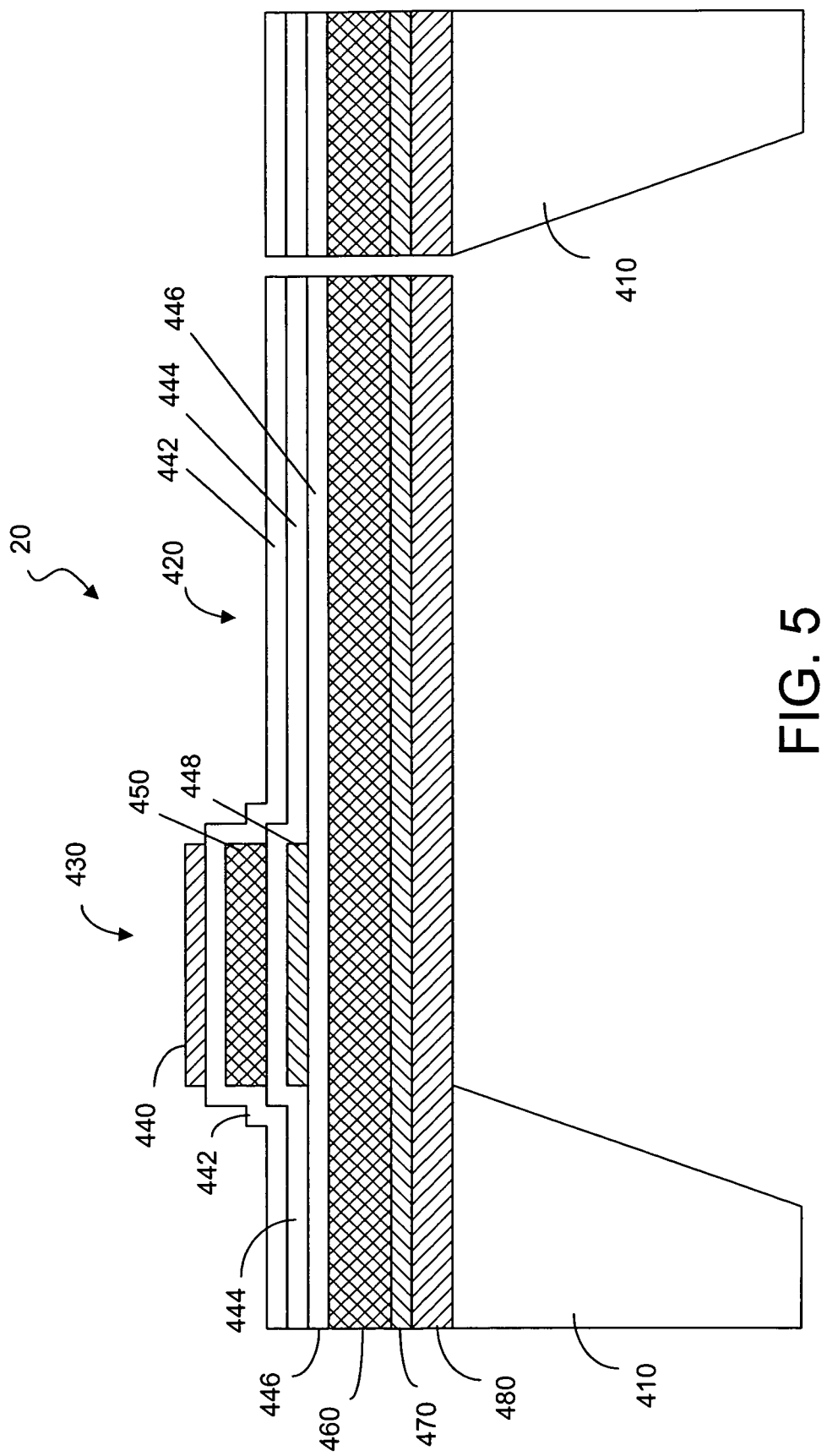
FIG. 5 shows an example of audio loudspeaker that can be used as a sound producing unit.
Figure 6:
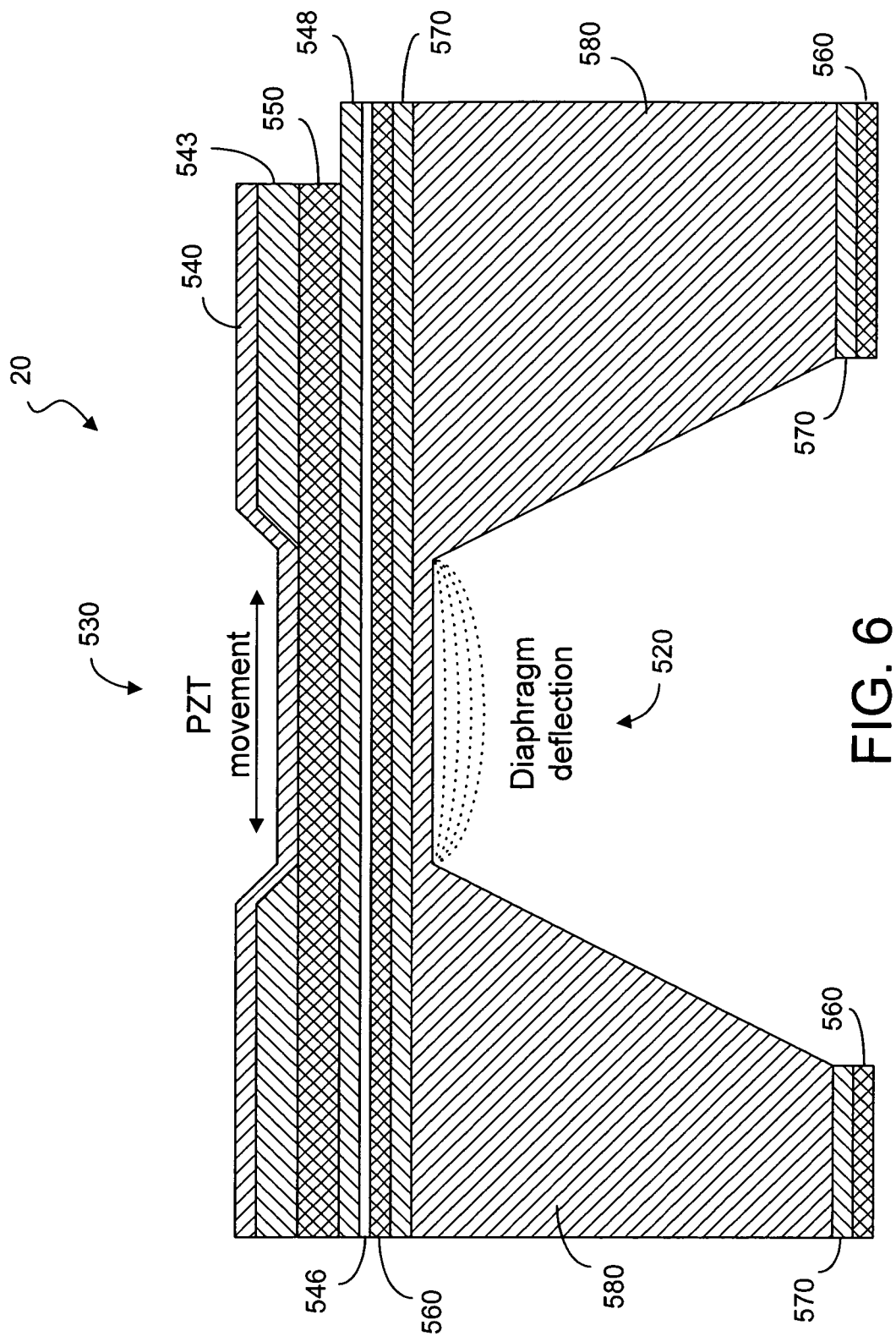
FIG. 6 shows the details of the audio loudspeaker of FIG. 5.

In yet another embodiment of the present invention, one or more of the loudspeakers can be a dual-mode sound producing unit, as shown in FIGS. 5 and 6. A dual-mode sound producing unit 20, as shown in FIGS. 5 and 6, includes a vibrating structural component (also called transducer) such as a membrane, a clamped-clamped beam, or a cantilever, or an array of such structures, which can be excited by a specific exciting signal so that it produces audible sound waves in the 20 Hz to 20 kHz range, for example. The vibration structure component can also be excited in a higher frequency range, such as an ultrasonic frequency range (about 30 kHz-120 kHz). At this frequency range, the transducer or transducer array can produce a directional beam of ultrasonic waves. Due to the non-linear interaction of ultrasonic waves in the air, the directional beam of ultrasonic waves becomes audible after traversing a distance. According to the present invention, the acoustic component that produces the audible sound in a conventional way is the same acoustic component that, when excited by ultrasound waves, produces substantially directional sound after the ultrasonic waves traverse a specific distance.

FIG. 5 is a cross sectional view of the dual-mode sound producing unit 20, showing a transducer 430 coupled to a cantilever diaphragm 420 on the substrate 410. As shown, the cantilever diaphragm 420 comprises a plurality of low temperature oxide (LTO) layers 442, 444, 446 on top of a silicon nitride layer 460. Below the silicon nitride layer 460, there is a thermal oxide layer 470, followed by a number of other layers. The transducer 430 comprises a piezoelectric (PZT) layer 450 sandwiched between two LTO layers 442 and 444. On top of the transducer 430 is an electrode layer 440, while the bottom electrode layer 448 is below the PZT layer 450.

Another example of the dual-mode sound producing units, according to a different embodiment of the present invention, is shown in FIG. 6. As shown in FIG. 6, the sound producing unit 20 has a transducer 530 coupled to a low frequency acoustic component 520. A thin section of a silicon substrate 580 is used as a diaphragm of the low frequency acoustic component. 520. On top of the low frequency acoustic component 520, the transducer 530 having a piezoelectric (PZT) layer 550, and a polynitride layer 543 is provided. A top electrode layer 540 and a bottom electrode layer 548 are used to provide an excitation electrical signal in order to induce the movement of the PZT layer 550. The transducer 530 is coupled to the low frequency acoustic component 520 via a plurality of layers, including an LTO layer 546, a silicon nitride layer 560 and silicon dioxide layer 570.

With the dual-mode sound producing unit 20, the diaphragm can be excited by a specific exciting signal so that it produces audible sound waves in the 20 Hz to 20 kHz range, for example. When the diaphragm is excited in a higher frequency range, such as an ultrasonic frequency range (about 30 kHz-120 kHz), the waves (carrier waves modulated by audio signal) in the near field are in the ultrasonic frequency and, therefore, not audible. As the waves travel through air, the carrier frequencies are lost due to the non-linear interaction of ultrasonic waves in the air. The envelope of the modulated waves produces audible sound while retaining at least part of the directivity of the wave pattern. As such, the audible sound produced by a device is largely confined to a small number of people. Thus, the sound producing unit 20 can be used in two modes, one for producing audio sounds in a wider angle and one for producing audio sounds in a narrower angle.

Figure 7:
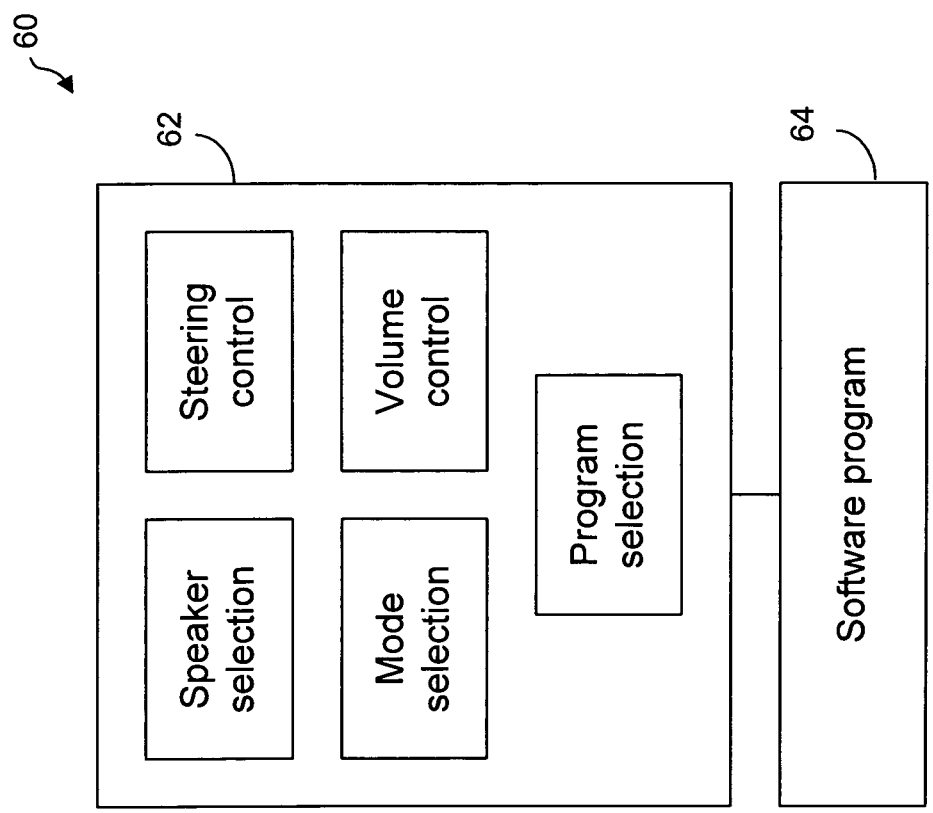
FIG. 7 illustrates an exemplary user-interface.

As illustrated in various embodiments, the present invention provides an apparatus, which comprises a plurality of sound producing units; a steering control; and a signal source for providing signals to the sound producing units for producing audio sounds, wherein each of the sound producing units is arranged to produce the audio sounds in a sound propagation direction and wherein the steering control is arranged to change the sound propagation direction of one or more sound producing units. In one embodiment of the present invention, each of the sound producing units is configured to produce the audio sounds in an angular range, and wherein the steering control is arranged to change the angular range of at least one of the sound producing units. In order to allow a user to use the apparatus 10 as a versatile sound producing device, the user interface 60 (see FIG. 1) may comprise an information input console 62 and a software program 64, as shown in FIG. 7. For example, the input console 62 comprises a program selection module to allow a user to choose the music/audio programs to be played; a mode selection module to allow a user to select the speaker mode of selected speakers (e.g. wide-angle sound mode, narrow-angle sound mode, stereo sound mode, etc.); a steering control to allow a user to selectively change the sound propagation direction of each selected speaker; and a volume control to allow a user to selectively adjust the audio level of each selected speaker. The input console 62 can be a part of a keyboard of the apparatus 10. The input console 62 can be presented as a touch screen displayed on the display 70 (see FIG. 1), for example. On the display 70, it is possible to provide a play-list to show a user what audio programs are available on the apparatus 10. The information input console 62 is operatively connected to a software program 64 which comprises programming codes to compile the input information into control data provided to the signal processor 50 (FIG. 1). The signal processor 50 can be an ASIC chip, for example. The software program 62 can be implemented on a computer readable storage medium. The software program 62 can be upgraded or changed to accommodate the audio features of the apparatus 10, for example.

In sum, the present invention provides an apparatus, which has a plurality of sound producing units; a steering control; and a signal source to provide signals to the sound producing units for producing audio sounds, wherein each of the sound producing units is arranged to produce the audio sounds in a sound propagation direction and wherein the steering control is arranged to change the sound propagation direction of one or more sound producing units.

According to various embodiments of the present invention, each of the sound producing units is configured to produce the audio sounds in an angular range, and the steering control is arranged to change to angular range of at least one of the sound producing units.

According to various embodiments of the present invention, the audio sounds produced on different sound producing units can be the same or different type or genre. The sounds can be stereo.

In one embodiment of the present invention, a sound producing unit comprises two loudspeakers, and each loudspeaker is steerable to change the sound propagation direction relative to the other loudspeaker.

In another embodiment of the present invention, a sound producing unit comprises an array of vibration elements, and the vibration elements can be arranged to change the sound propagation direction of said one sound producing unit.

In yet another embodiment of the present invention, a sound producing unit comprises an array of vibration elements, and the vibration elements are arranged to change the sound angular range of said one sound producing unit.

In a different embodiment, at least one of sound producing units is a dual-mode sound producing module, which is excitable in a first mode by an exciting signal in an audio frequency range and a second mode by an exciting signal in an ultrasound frequency range.

According to various embodiment of the present invention, the steering control comprises an electro-mechanical movement module, a mechanical component, or a reflecting surface for changing orientation of one or more sound producing units.

According to different embodiments of the present invention, the sound producing unit comprises an array of vibration elements, and the steering control comprises one or more transducers arranged to move the vibration elements for changing the sound propagation direction and/or the sound angular range of the sound producing unit.

According to various embodiments of the present invention, the apparatus also has a user interface comprising selectable items for allowing a user to select the sound producing units and the sound propagation direction of one or more sound producing units. Part or the entire user interface can be implemented as a touch screen on a display.

Various features on the user interface can be carried out by a software program embedded in a computer readable storage medium.

According to various embodiments of the present invention, the audio data for producing the audio sounds can be stored in a fixed memory or a removable memory unit.

The apparatus can be a wireless device which has a receiver arranged to receive audio data for producing the signals.

The present invention also provides a method for producing sounds in a sound producing apparatus, and the method comprises: selecting one or more of a plurality of sound producing units in a sound producing device, wherein each of the sound producing units is arranged to produce audio sounds in a sound propagation direction; and adjusting the sound propagation direction of at least one of the sound producing units relative to the sound propagation direction of another sound producing unit.

According to various embodiments of the present invention, each of the sound producing units is configured to produce the audio sounds in an angular range, and the method further comprises adjusting the angular range of at least one of the sound producing units.

In general, the present invention provides an apparatus comprising means for producing audio sounds comprising a plurality of sound producing units, each sound producing unit arranged to produce the audio sounds in a sound propagation direction; means for selecting the sound producing units; and means for controlling the sound propagation direction of at least one selected sound producing unit.

According to various embodiments of the present invention, each of the sound producing units is configured to produce the audio sounds in an angular range, and the apparatus further comprises means for adjusting the angular range of at least one of the sound producing units The apparatus, according to various embodiments of the present invention, can be a communication device, such as a mobile phone, or a standalone entertainment device, such as an audio/video player. The apparatus can also a mixed use device such as a gaming console.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An apparatus, comprising:
   a plurality of sound producing units comprising at least a first sound producing unit and a second sound producing unit spaced from the first sound producing unit within the apparatus, wherein the first sound producing unit and the second sound producing unit are independent sound producing units which can produce audible sounds independent of each other;
   a steering control to adjust a sound propagation direction of at least the first sound producing unit; and
   a signal source to provide audio signals to the sound producing units, wherein the first sound producing unit is configured to produce a first audible sound in a first sound propagation direction and the second sound producing unit is configured to produce a second audible sound in a second sound propagation direction, wherein the first audible sound and the second audible sound are from separate sound producing units, wherein at least the first sound propagation direction of the first sound producing unit is independently adjustable based on the steering control, wherein the first sound propagation direction is changed relative to the second sound propagation direction, and where the apparatus is a portable electronic device.

2. The apparatus of claim 1, wherein each of the sound producing units is configured to produce the audio sounds in an angular range, and wherein the steering control is arranged to change to angular range of the first sound producing unit.

3. The apparatus of claim 1, wherein the audio sounds produced on at least one of the sound producing units are different from the audio sounds produced on the other of the sound producing units.

4. The apparatus of claim 1, wherein two or more of the sound producing units are arranged to produce stereo audio sounds.

5. The apparatus of claim 1, wherein the steering control comprises an electro-mechanical movement module for changing orientation of the first sound producing unit.

6. The apparatus of claim 1, wherein the steering control comprises a mechanical component for changing orientation of the first sound producing unit.

7. The apparatus of claim 1, further comprising:
   a user interface comprising a display of selectable items for allowing a user to select the sound producing units and the sound propagation direction of one or more sound producing units.

8. The apparatus of claim 7, further comprising:
   a processor arranged to effect the sound propagation direction selected by the user; and
   a computer readable storage medium having embedded programming codes to provide information to the processor indicative of selection made by the user.

9. The apparatus of claim 1, further comprising:
   a sound data storage comprises a removable memory unit and arranged to provide audio data to the signal source for producing the signals.

10. The apparatus of claim 1, further comprising: a receiver arranged to receive audio data for producing the signals.

11. The apparatus according to claim 1, wherein the first sound producing unit and the second sound producing unit are arranged to produce audible sound waves in a range of 20 Hz to 20 KHz.

12. The apparatus according to claim 1, wherein the first sound producing unit and the second sound producing unit are configured to be excited in an ultrasonic frequency range of 30 kHz to 120 kHz so as to produce ultrasonic waves which become audible after traversing a distance due to non-linear interaction of the ultrasonic waves in air.

13. A method, comprising:
   selecting one or more of a plurality of sound producing units in a sound producing device, wherein at least a first sound producing unit and a second sound producing unit are independent sound producing units which can produce audio sounds independent of each other and in different sound propagation directions, the audio sounds being from separate sound producing units; and
   adjusting the sound propagation direction of at least one of the sound producing units independently of another one of the sound producing units,
   wherein the sound propagation direction of the at least one sound producing unit is changed relative to a sound propagation direction of the another one of the sound producing units, and
   wherein the sound producing device comprises a portable electronic device.

14. The method of claim 13, wherein each of the sound producing units is configured to produce the audio sounds in an angular range, said method further comprising: adjusting the angular range of at least one of the sound producing units.

15. The method according to claim 13, wherein each of the sound producing units is arranged to produce audible sound waves in a range of 20 Hz to 20 KHz.

16. The method according to claim 13, wherein the audio sounds produced on at least one of the sound producing units are different from the audio sounds produced on the other of the sound producing units.

17. The method according to claim 13, wherein the first sound producing unit and the second sound producing unit are configured to be excited in an ultrasonic frequency range of 30 kHz to 120 kHz so as to produce ultrasonic waves which become audible after traversing a distance due to non-linear interaction of the ultrasonic waves in air.

18. A non-transitory computer readable medium having programming codes embedded therein, the programming codes configured to, when executed by a processor:
   select one or more of a plurality of sound producing units in a sound producing device, wherein at least a first sound producing unit and a second sound producing unit are independent sound producing units which can produce audio sounds independent of each other and in different sound propagation directions, the audio sounds being from separate sound producing units; and
   adjust the sound propagation direction of at least one of the sound producing units independently of another one of the sound producing units, wherein the sound propagation direction of the at least one sound producing unit is changed relative to a sound propagation direction of the another one of the sound producing units, and
   wherein the sound producing device comprises a portable electronic device.

19. The non-transitory computer readable medium of claim 18, wherein each of the sound producing units is configured to produce the audio sounds in an angular range, the programming codes further configured to adjust the angular range of at least one of the sound producing units.

20. The computer program product according to claim 18, wherein the first sound producing unit and the second sound producing unit are configured to be excited in an ultrasonic frequency range of 30 kHz to 120 kHz so as to produce ultrasonic waves which become audible after traversing a distance due to non-linear interaction of the ultrasonic waves in air.

* * * * *